United States Patent Office 2,774,758
Patented Dec. 18, 1956

2,774,758

MORPHOLINE DERIVATIVE

William H. Yanko, Dayton, Ohio, assignor to Monsanto Chemical Company, St. Louis, Mo., a corporation of Delaware No Drawing. Application August 5, 1954,
Serial No. 448,143

3 Claims. (Cl. 260—247)

This invention provides 4-morpholinesuccinonitrile, a new compound which is a highly valuable rodent repellant, and to a process of preparing the same.

I have found said nitrile to be readily obtainable by the addition reaction of morpholine with fumaronitrile, substantially according to the scheme:

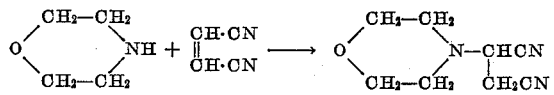

Reaction of the morpholine with the fumaronitrile takes place by simply allowing a mixture of the two to stand at ordinary, increased or decreased temperatures until formation of the 4-morpholinesuccinonitrile has occurred. This is generaly evidenced by solidification of the reaction mixture. Because the addition reaction is exothermic, it is often advantageous to employ external cooling in order to prevent or minmize side reactions, e. g., polymerization. This is particularly true when working with large quantities of reactants. The exothermic reaction heat may also be dissipated by employing vigorous stirring, and/or an inert solvent or diluent. Such solvents or diluents may be, e. g., dioxane, ethanol, acetone, benzene, etc. Working in the presence of an extraneous, inert diluent permits operation at increased temperatures, e. g., at the refluxing temperature of the reaction mixture, whereby very good yields of product are obtainable within short reaction periods.

Inasmuch as molecular equivalents of the morpholine and the fumaronitrile are involved in formation of the present 4-morpholinesuccinonitrile, it is advantageous to employ stoichiometric proportions of the two reactants. If desired, however, an excess of either reactant may be employed, since any unreacted material is readily separated from the product. When operating in the absence of a diluent and with substantially equimolar proportions of the reactants, the reaction product generally consists of the 4-morpholinesuccinonitrile with, perhaps, very small amounts of the unreacted materials, depending upon the reaction conditions used. For many purposes the reaction product thus formed may be used directly without resorting to purification procedures. However, if desired, a product of a high grade of purity may be obtained by recrystallization, e. g., from ethanol. When operating in the presence of a diluent it is advantageous to employ as the diluent a liquid in which the initial reactants are soluble and in which the 4-morpholinesuccinonitrile is insoluble. The latter is then removed from the reaction mixture simply by filtration.

4-morpholine succinonitrile is a stable crystalline product melting at about 117° C. It is advantageously employed in the chemical and allied industries for a wide variety of purposes, e. g., as a plasticizer or as a biological toxicant. It is particularly useful as a rodent repellent.

The invention is further illustrated, but not limited, by the following examples:

Example 1

Morpholine (93 g.) was added to 78 g. of fumaronitrile at room temperature. The mixture was then agitated while cooling in a water bath. An exothermic reaction occurred whereby the temperature of the reaction mixture rose to about 70° C. After being allowed to stand overnight without taking any precautions for external cooling, the reaction mixture thickened and solidfied on cooling. The solidified product was recrystallized 3 times from methanol and decolorized by treatment with activated charcoal. There was thus obtained 79 g. of the substantially pure white crystalline 4-morpholinesuccinonitrile M. P. 117.0–117.5° C. and analyzing as follows:

|  | Found | Calcd. for $C_8H_{11}ON_3$ |
|---|---|---|
| Percent C | 57.98 | 58.2 |
| Percent H | 6.82 | 6.68 |
| Percent N | 25.47 | 25.46 |

Besides the product, M. P. 117.0–117.5° C. there was obtained 43 g. of a second crop of crystals which represented a somewhat impure product.

Example 2

To 200 ml. of morpholine there was gradually added 78 g. of fumaronitrile at a temperature of 30–35° C. and with constant stirring. An additional 100 ml. portion of morpholine was then added to the reaction mixture and, in order to facilitate stirring, 300 ml. of tert-butyl alcohol was introduced into the reaction mixture to serve as diluent. An additional 78 g. portion of fumaronitrile was then gradually added to the whole, and the resulting mixture was heated at 50° C. for one hour. At the end of that time the heated reaction mixture was poured into 1-liter of ethanol and the whole was refluxed for a period of one hour at the end of which time complete solution was noted. Upon allowing the resulting reaction mixture to cool, a solid product separated out. It was filtered off and washed with a 1:5 ethanol-hexane mixture and finally with hexane. The washed solid (320 g., 97% theoretical yield) comprised the substantially pure 4-morpholinesuccinonitrile M. P. 117.0–117.5° C. It was found to analyze as follows:

|  | Found | Calcd. for $C_8H_{11}ON_3$ |
|---|---|---|
| Percent C | 57.85 | 58.2 |
| Percent H | 6.51 | 6.68 |
| Percent N | 25.48 | 25.46 |

What I claim is:
1. The method which comprises contacting morpholine with fumaronitrile and recovering 4-morpholinesuccinonitrile from the resulting reaction product.
2. The method which comprises contacting morpholine with fumaronitrile in the presence of an inert diluent and recovering 4-morpholinesuccinonitrile from the resulting reaction product.
3. The method which comprises heating morpholine with fumaronitrile in the presence of an insert diluent and recovering 4-morpholinesuccinonitrile from the resulting reaction product.

References Cited in the file of this patent

UNITED STATES PATENTS

| | | |
|---|---|---|
| 1,992,615 | Hoffman | Feb. 20, 1935 |
| 2,532,561 | Langkammer | Dec. 5, 1950 |

FOREIGN PATENTS

| | | |
|---|---|---|
| 404,744 | Great Britain | Jan. 25, 1934 |
| 457,621 | Great Britain | Dec. 2, 1936 |

OTHER REFERENCES

Adams et al.: Org. Reactions, vol. V, pp. 79–135 (1949), particularly pp. 79–87.

Whitmore et al.: J. Am. Chem. Soc., vol. 66, pp. 725–31 (1944).